United States Patent [19]

Buergle et al.

[11] 4,224,425

[45] Sep. 23, 1980

[54] PARTIAL POLYMERIZATION METHOD FOR VINYL MONOMERS

[75] Inventors: Peter Buergle, Darmstadt; Karl Maurer, Lautertal; Manfred Munzer, Bensheim; Wilhelm Rosskopp; Franz Wenzel, both of Darmstadt, all of Fed. Rep. of Germany

[73] Assignee: Röhm GmbH, Darmstadt, Fed. Rep. of Germany

[21] Appl. No.: 28,436

[22] Filed: Apr. 9, 1979

[30] Foreign Application Priority Data

Apr. 22, 1978 [DE] Fed. Rep. of Germany ....... 2817754

[51] Int. Cl.² .................... C08F 2/02; C08F 2/42; C08F 4/34; C08F 20/14
[52] U.S. Cl. ........................... 526/85; 526/75; 526/82; 526/222; 526/223; 526/224; 526/230.5; 526/329.7
[58] Field of Search ............... 526/85, 222, 223, 224, 526/230.5, 82, 75, 329.7

[56] References Cited

U.S. PATENT DOCUMENTS

| | | | |
|---|---|---|---|
| 2,370,588 | 2/1945 | Strain | 526/230.5 |
| 2,425,840 | 8/1947 | Schulze et al. | 526/85 |
| 2,574,020 | 11/1951 | Crouch | 526/85 |
| 3,296,228 | 1/1967 | Squire | 526/230.5 |
| 3,821,273 | 6/1974 | D'Angelo | 526/230.5 |

FOREIGN PATENT DOCUMENTS

| | | | |
|---|---|---|---|
| 1083057 | 6/1960 | Fed. Rep. of Germany . | |
| 1175439 | 8/1964 | Fed. Rep. of Germany . | |
| 1245128 | 7/1967 | Fed. Rep. of Germany . | |
| 1645203 | 2/1970 | Fed. Rep. of Germany . | |
| 1964990 | 6/1970 | Fed. Rep. of Germany | 526/85 |
| 2704768 | 8/1977 | Fed. Rep. of Germany . | |
| 896905 | 5/1962 | United Kingdom | 526/85 |

*Primary Examiner*—John Kight, III
*Attorney, Agent, or Firm*—Curtis, Morris & Safford

[57] ABSTRACT

What is disclosed is a method for the partial polymerization of at least one vinyl monomer to form a mixture of said monomer with a polymer thereof, which comprises initiating polymerization of said monomer with a percarbonic acid ester and inhibiting further polymerization when the desired mixture is formed by addition thereto of a thioether, an organic disulfide, or a mercaptan, as are the partially-polymerized mixtures so produced, and their use for forming an organic glass by further polymerization thereof.

7 Claims, No Drawings

PARTIAL POLYMERIZATION METHOD FOR VINYL MONOMERS

The present invention relates to methods for the partial polymerization of vinyl monomers by initiating polymerization with an organic peroxide and terminating polymerization with a polymerization inhibitor, to the partially-polymerized vinyl monomers, and to the use of the partially polymerized vinyl monomers for the production of organic glass.

The partial polymerization of vinyl monomers is of industrial importance for the manufacture of liquid resins which can be hardened by polymerization. As compared with pure vinyl monomers, polymerized mixtures which, in addition to unpolymerized vinyl monomers, contain a polymer thereof polymerize with less development of heat and, in part, also in a substantially shorter period of time. The partially polymerized monomers which, in solvent-free form, are referred to as polymer syrups, can be used as a coating agent or as a binding agent for granular or fibrous materials, for instance. They find preferred use in the manufacture of organic glass, in which they are completely polymerized in the form of a layer to form hard plastic plates.

Polymer syrups or comparable mixtures which contain unpolymerized vinyl monomers and a polymer thereof are prepared most economically by partial polymerization of a vinyl monomer. Various methods have been developed for stopping the polymerization at the desired conversion. These processes do not make it possible satisfactorily to obtain the desired properties of polymer syrups. As a rule, polymer syrups should have the highest possible polymer content but at the same time the lowest possible viscosity. Furthermore, they should be capable of being hardened by ordinary initiators and permit the manufacture of high molecular weight polymers.

It is known in the prior art to produce a polymer syrup having a viscosity from 0.5 to 50 poise (50–5000 mPa.s) which contains about 35% of polymethylmethacrylate in dissolved form and not more than 20 ppm of a polymerization initiator and a stabilizing agent. Such a syrup is sufficiently resistant to further polymerization at room temperature to be handled on an industrial scale and to be able to be used for the production of cast acrylic glass panes or other polymerization products. The need for a high polymer content and a low viscosity can be satisfied only by a relatively low molecular weight of the dissolved polymer. The polymers in the known syrups have an intrinsic viscosity of 0.25 to 1.0 poise which [according to "Makromol. Chemie", VII/3, 294 (1952)] corresponds with a molecular weight of between about 40,000 and 250,000. Molecular weights in this range are attained by polymerization in the presence of chain transfer agents, particularly mercaptans. Their presence in the syrup has the result that, even upon further processing, a polymer of relatively low molecular weight is obtained. However, a high molecular weight is advantageous for the properties of the polymer in technical uses thereof.

In accordance with other prior art, polymer syrups are obtained by the polymerization of methyl methacrylate in the presence of azo initiators and thiodicarboxylic acid diesters. To interrupt the polymerization, it is necessary to cool to below the decomposition temperature of the initiator within a very short period of time, which is generally not possible on an industrial scale.

As is known, polymers of low molecular weight can also be produced in the absence of regulators by polymerization with a high current of free radicals. However, it is not possible with the initiators customary in the polymerization art to abruptly interrupt the high flow of radicals upon reaching the desired rate of conversion. The strong development of heat during polymerization makes sudden external cooling impossible. On the other hand, if an intiator is used which is completely consumed by the time that the desired prepolymerization conversion is obtained, then the flow of radicals gradually fades away during this interval of time and towards the end of the prepolymerization produces a very high molecular weight polymer which undesirably increases the viscosity of the syrup.

This disadvantage is also present in another prior art in which small amounts of an initiator which decomposes practically spontaneously at the prevailing polymerization temperature are added continuously to a polymerizing mixture. In the practical use of this process one is, to be sure, limited to the use of initiators whose half-life is not substantially less than about one minute under the polymerization conditions. Until the complete consumption of the last amount of initiator added, a few more minutes pass, during which polymer is formed the molecular weight of which increases to the same degree as the radical flow gradually decreases. Polymer syrups of the desired low viscosity can therefore not be produced by this process without the simultaneous use of regulators.

The interruption of a polymerization taking place with high radical flow by the addition of polymerization inhibitors, without the detrimental effect of a dying-out phase, is possible only within certain limits. In certain cases, it is true, it is possible to stop the polymerization by the addition of inhibitors such as hydroquinone, pyrocatechol, or phenols, with simultaneous external cooling and addition of cold monomer. However, the method can only be carried out with a limited batch size, sufficient cooling surface, and a moderate radical flow which again in its turn makes the simultaneous use of regulators necessary. If one were to operate with a high radical flow without a regulator, such a large amount of inhibitor would be necessary that the subsequent curing of the syrup by radical polymerization would no longer be possible.

The partial polymerization of vinyl monomers in large batches without the simultaneous use of regulators is known from still other prior art. Interruption in this process is effected by the injection of oxygen and simultaneous cooling. During the interruption phase, considerable quantities are formed of a polymeric peroxide which decomposes at the temperatures at which the plastics produced from the syrups are customarily used. In this way a substantial amount of depolymerization occurs, as well as other uncontrolled decomposition phenomena, which can result in a discoloring of the polymer or in impaired mechanical properties.

The object of the present invention is partially to polymerize vinyl monomers and to break off the polymerization without rapid external cooling in such a manner that no undesired increase in viscosity occurs during the interruption phase and that the partially polymerized mixture can be cured, by radical polymerization, to form polymers of high molecular weight and good mechanical and thermal properties.

The attainment of this object by the process of the invention is based on a specific reaction between a percarbonic acid ester used as a polymerization initiator and a thioether, organic disulfide, or mercaptan. From an article by L. Horner and E. Jurgens [Liebigs Annalen der Chemie, 602, 135 (1956)] it is known that diacyl peroxides react with thioethers to form, on the one hand, the corresponding sulfoxides and, on the other hand, acylated thioethers. Since this reaction takes place even at moderate temperatures, it appeared at first sight suitable to decompose diacyl peroxides in a polymerizing mixture in order to interrupt the polymerization. However, using the dibenzoyl peroxide employed by Horner and Jurgens and other common peroxide initiators, the initiation of the radical polymerization proved to be a reaction which is preferred to the reaction of these peroxides with thioethers; that is, the radical polymerization takes place practically undisturbed in the presence of thioethers. Surprisingly, this is not true of percarbonic acid esters. Their reaction with thioethers, organic disulfides, and mercaptans proceeds under decomposition conditions in such a manner that there is no longer an initiation of radical polymerization. A polymerization initiated by percarbonic acid esters can therefore be spontaneously interrupted by the addition of the said sulfur compounds, but can continue undisturbed at any time after the addition of other radical-forming initiators.

The process of the invention serves primarily for the production of polymer syrups by the partial polymerization of vinyl monomers in bulk, i.e. without the addition of nonpolymerizable solvents or diluents. However, the process can also be carried out with other mixtures in which the percarbonic acid ester is present in a homogeneous liquid phase and can react there spontaneously with the added sulfur compound. In the presence of liquids which are capable of dissolving the vinyl monomer, the percarbonic acid ester, and the sulfur compound used for the interruption, solution or precipitation polymerizations can be carried out and be interrupted at the desired conversion.

Interruption preferably takes place after a conversion of the vinyl monomer of at least 20% by weight. The viscosity of a polymer syrup produced in accordance with the invention is preferably not more than 100 seconds, measured at 20° C. in a 6 ml beaker according to DIN 53211. The average molecular weight of the polymers in the preferred syrups is below the limit of $M_w = 500,000$, and in particular within the range of 200,000 to 300,000. In order that the average molecular weight and the viscosity of the syrup remain below the desired limits, a time for the interruption is selected when the radical flow is still high and the initiator concentration has not yet dropped more than to about one half to one-quarter of the original concentration or the concentration maintained by subsequent feed of initiator.

In accordance with the process of the invention, all vinyl monomers polymerizable by organic peroxides, and their mixtures, can be partially polymerized. The polymerizing mixture should form a liquid phase, at least under the reaction conditions, until the interruption of the polymerization. As vinyl monomers, esters of acrylic and methacrylic acid, the nitriles and amides of said acids, styrene, vinyl toluene, vinyl esters of aliphatic carboxylic acids, and vinylidene chloride come into consideration. The process is preferably employed for the polymerization of methyl methacrylate, or of a mixture consisting of at least 80% by weight of methylmethacrylate with the balance consisting of other monomers copolymerizable therewith, and in particular for the production of solvent-free polymer syrups having this base.

As percarboxylic acid esters, compounds of the formula

RO—CO—O—O—CO—OR, in which R is a straight-chain, branched, or cyclic aliphatic group, preferably a hydrocarbon, having 2 to 20 carbon atoms are preferably used. Examples of such peroxide dicarbonates are diisopropyl-, di-n-butyl-, di-(2-ethylhexyl)-, dicyclohexyl-, di-(4-tert.-butylcyclohexyl)-, di-cetyl-, di-myristyl-, and di-isotridecylperoxydicarbonates, all of which are available as comerical products. They have a half life of about 1 hour at 56° C. If the molecular weight of the resultant polymer is to be controlled by the quantity of initiator, the quantity necessary is determined in a preliminary test by interrupting the polymerization. For instance, a test batch is poured into a cold inhibitor solution and the molecular weight of the polymer fraction (or its intrinsic viscosity) is determined by known methods. To be sure, the size of the batch, the cooling capacity, and other properties of the technical polymerization apparatus exert a certain influence on the course of the polymerization, so that small corrections in the amount of initiator may be necessary upon conversion from laboratory batch to industrial scale. As a rule, the amount of initiator required is 0.05 to 1%, by weight of the monomers.

As a rule, the polymerization is effected batchwise in an agitator vessel with heating and cooling arrangements. The vinyl monomer or the mixture of vinyl monomers, possibly together with a quantity of solvents or diluents, can be placed together with the initiator in the reaction vessel and the polymerization started by heating to 40° C. to 80° C. As a rule, the cooling capacity is not sufficient to maintain the temperature in the vessel constant. Therefore, the temperature increases to 90° C. to 95° C. during the course of the prepolymerization. The increase in temperature compensates for the decrease in the initiator concentration so that the radical flow scarcely drops during the prepolymerization, but, rather, tends to rise.

In the preferred manner of operation, the initiator-containing vinyl monomer is allowed to flow gradually into the reaction vessel from a storage vessel during the polymerization. Because the monomer is allowed to run in cold and because the reaction vessel is simultaneously cooled from the outside, the polymerization temperature can be maintained below 100° C. even for batches on an industrial scale so that, for instance, methyl methacrylate does not boil. As soon as the desired conversion has been reached, the polymerization is interrupted by addition of a thioether, an organic disulfide, or mercaptan. Distribution of the interruption agent is facilitated if it is added mixed together with a part of the vinyl monomer.

The sulfur compounds which are to be used as an interruption agent in accordance with the invention are not entirely equivalent to each other. They differ in their effect on the course of polymerization during further processing of the polymer syrup. The mercaptans, as is known, have a strong regulating action, i.e. they decrease the molecular weight of the polymer produced in their presence. Disulfides have a substantially smaller regulating action and thioethers practically none. Since, in general, high molecular weights are desired, disulfides and thioethers are preferred, the latter being particularly preferred. The residue of the sulfur compound remaining in the cured final product has a definite thermo-stabilizing action which has an advantageous effect both on the thermoplastic processing of molding compositions and on the thermo-forming of plates, pipes, and the like.

Polymerization will be interrupted upon the addition of an amount of sulfur compound which is equivalent to or exceeds the amount of peroxydicarbonate initiator present. The undesired regulating action can be suppressed by adding only such an amount of the sulfur compound having a regulating action as is consumed in the interruption reaction, namely an amount just equivalent to the amount of peroxydicarbonate present at the time of the interruption. This can be determined empirically by a preliminary test.

The thioethers preferably used can be represented by the formula $$R-CH_2-S-CH_2-R',$$

in which R and R' represent identical or different organic groups having 2 to 30 carbon atoms. The organic radicals may be of an aliphatic, aromatic, or mixed aliphatic-aromatic nature and may possibly contain heteroatoms and different functional groups.

One preferred group of thioethers has the formula $$R''-X-A-CH_2-S-CH_2-A-X-R''.$$

Herein A is a lower alkylene group, preferably a methylene or ethylene group, R'' is an aliphatic, aromatic, or araliphatic radical having up to 20 C-atoms, and X represents the ester group $-CO-O-$, in which the bifunctional oxygen atom can be bound either to A or to R''. As examples of such compounds, mention may be made of thio-bis-propionic acid-methyl ester or -lauryl ester, thio-bis-isobutyric acid methyl ester, and di-(3,5-di-tert.-butyl-4-hydroxyphenyl-propionyloxyethyl)-sulfide. R'' is preferably a hydrogen group.

Suitable disulfides are, for instance, those of the general formula $$R-CH_2-S-S-CH_2-R',$$

in which R and R' may have the same meaning as given above for the thioethers. R and R' are preferably aliphatic groups, preferably also hydrocrbons, having 1 to 20 carbon atoms. For example, diethyl disulfide, dibutyl disulfide, dicyclohexyl disulfide, dioctyl disulfide or di-tert.-dodecyl disulfide can be used.

As mercaptans, the compounds which are customarily used as regulators are suitable, such as n-dodecylmercaptan, tert.-dodecylmercaptan, thioglycolic acid esters of mono- or polyhydric alcohols having 1 to 20 carbon atoms such as the methyl-, butyl-, octyl-, ethyleneglycol- or pentaerythritol esters, or pentaerythritol-tetra-ϵ-mercapto caproic acid ester.

As a rule, external cooling is effected already during prepolymerization. If not, cooling should be started at the latest upon the addition of the interrupting agent in order to protect the partially polymerized monomer, by a temperature below 25° C., from undesired further polymerization until its further use. The lower the temperature, the longer the mixture can be stored without the danger of polymerization.

The partially polymerized material can be cured in known manner with ordinary initiators such as dibenzoyl peroxide or azo-bis-isobutyronitrile at the customary polymerization temperatures. When used as coating agents, the material can also be cured by suitable activating radiation. The solvents can be evaporated during curing from coating mixtures which contain nonpolymerizable solvents.

The partially polymerized mixtures in the form of a polymer syrup are preferably used for the production of organic glasses, the syrup being cured in the form of a layer to form a plate. The production of acrylic glass is of particular importance. The advantageous influence of an excess of the thioether used as interruption agent is evident from the Vicat softening temperature. After conclusion of the final curing, this temperature is 112° C. and after half an hour of heat treatment at 160° C. it drops only by 7° C. to 105° C. On the other hand, the Vicat softening point in the case of comparable material free of thioether drops to 100° C. under the same heat stress. This difference is significant in many fields of use.

A better understanding of the present invention and of its many advantages will be had by referring to the following specific examples, given by way of illustration.

EXAMPLE 1

60 parts of a mixture of 99.8 percent by weight of methyl methacrylate and 0.2 percent by weight of isopropyl percarbonate are put in a reaction vessel provided with an agitator and are heated to 90° C. Within 15 minutes, an additional 40 parts of the same mixture are uniformly added, the temperature of 90° C. being maintained. Directly thereafter, 0.5 part of thiodipropionic acid dilauryl ester, dissolved in methyl methacrylate, are added, whereupon polymerization immediately stops. The batch is then cooled to room temperature.

A syrup having an efflux time of 30 seconds in a 6 mm flow-orifice cup in accordance with DIN 53211 (20° C.) is obtained. The polymer content is about 25 percent by weight. Its molecular weight, $M_w$, is 250,000.

For the production of acrylic glass plates, the syrup is treated with 0.05% dilauroyl peroxide and cured between panes of glass at 50° C. A molecular weight, $M_w$, of 1,000,000 is determined on the final product.

If the thiodipropionic acid dilauryl ester is added only 5 minutes after the termination of the feeding of the monomer, a syrup having an efflux time of 80 seconds (6 mm DIN cup, 20° C.) is obtained with practically the same polymer content.

Approximately the same results are obtained if one uses either 0.4 part of dicyclohexyl percarbonate or 0.55 part of dicetyl percarbonate instead of 0.2 parts diisopropyl percarbonate.

EXAMPLE 2

Instead of methyl methacrylate, a mixture of this ester with methyl acrylate in a weight ratio of 9:1 is used in the process of Example 1. A syrup having approximately the same properties is obtained.

EXAMPLE 3

The process according to Example 1 is repeated with styrene instead of methyl methacrylate. The syrup obtained substantially agrees with that of Example 1 with respect to polymer content, efflux time, and polymerization properties.

EXAMPLE 4

The same procedure is used as in Example 1, but, at the end of the addition of monomer, 0.5 part of dodecylmercaptan is added instead of the thioether. The polymerization is complete after a short time. A syrup containing 20 to 25 percent by weight of polymer and an efflux time of 20 seconds (6 mm DIN cup, 20° C.) is obtained.

EXAMPLE 5

The same procedure is used as in Example 1, but, at the end of the addition of the monomer, 0.5 part of diethyldisulfide is added instead of the thioether. The polymerization immediately comes to a stop. A syrup of 20 to 25 percent by weight of polymer content with an efflux time of 40 seconds (6 mm DIN cup, 20° C.) is obtained

EXAMPLE 6

The same procedure is used as in Example 1, but the polymerization is broken off with 0.08 part of bis-(2-methoxycarbonylpropyl)-sulfide. A syrup with 24 to 25 percent by weight of a polymer having $M_w = 188,000$ is obtained.

EXAMPLE 7

The same procedure is used as in Example 1, but the polymerization is interrupted with 0.2 part of bis-(2-methoxycarbonylethyl)-sulfide. A syrup with 26 percent by weight of a polymer having $M_w = 220,000$ is obtained.

EXAMPLES 8–16

The procedure of Example 1 is followed, however the amounts of sulfur compound shown in the Table I below are added after addition of monomer is ended.

TABLE I

| Example | Sulfur Compound | Amount (%) | Viscosity (Sec., 6 mm-cup, according to DIN 53211) | Average Molecular Weight $M_w$ | Conversion (%) |
|---|---|---|---|---|---|
| 8 | Diethylsulfide | 0.05 | 30–35 | — | 16–18 |
| 9 | Di-tert.-Butylsulfide | 0.1 | — | 240,000 | 23–25 |
| 10 | Phenylmethylsulfide | 0.25 | — | 175,000 | 20–22 |
| 11 | Phenylmercaptopropionic acid ethyl ester | 0.15 | 35–40 | — | 28–30 |
| 12 | Di(3,5-di-tert.-butyl-4-hydroxyphenylpropionyloxyethyl)-sulfide | 0.8 | — | 210,000 | 20–22 |
| 13 | n-Octylmercaptan | 0.1 | — | 230,000 | 27 |
| 14 | Pentaerythrite-tetrathioglycolate | 0.7 | — | 175,00 | 25–27 |
| 15 | Cyclohexylmercaptan | 0.3 | 30 | — | 18–19 |
| 16 | Di-Butyldisulfide | 0.05 | 40 | — | 33 |

We claim:

1. A method for making an organic glass which comprises first initiating the partial polymerization, in bulk, of a vinyl monomer which is methyl methacrylate or a mixture consisting of at least 80 1 percent by weight of methyl methacrylate with the balance being other vinyl monomers copolymerizable therewith, with a percarbonic acid ester to form a partially-polymerized mixture of said vinyl monomer with a polymer thereof, inhibiting further polymerization in the desired mixture of monomer and polymer after a conversion of the vinyl monomer of at least 20 percent by weight by the addition thereto of a thioether, an organic disulfide, or a mercaptan, and then further polymerizing said partially-polymerized mixture to form said organic glass.

2. A method as in claim 1 wherein such an amount of said percarbonic acid ester is used in the partial polymerizated that the polymer produced in said mixture has a weight average molecular weight $M_w$ less than 500,000.

3. A method as in claim 1 wherein the partial polymerization is inhibited when the viscosity of said mixture is not more than 100 sec. measured at 20° C. with a 6 mm beaker in accordance with DIN 53211.

4. A method as in claim 1 wherein said percarbonic acid ester is a compound of the formula $$RO-CO-O-O-CO-OR,$$

wherein R is a straight-chain, branched, or cyclic aliphatic group having 2 to 20 C-atoms.

5. A method as in claim 1 wherein said thioether is a compound of the formula $$R-CH_2-S-CH_2-R',$$

wherein R and R' are the same or different organic groups having 3 to 30 carbon atoms.

6. A method as in claim 1 wherein the partial is carried out at least predominantly at a temperature from 80° C. to 100° C.

7. A method as in claim 1 wherein cold monomer is added during the course of the partial polymerization.

* * * * *